United States Patent
Pang et al.

(10) Patent No.: US 9,456,153 B2
(45) Date of Patent: Sep. 27, 2016

(54) PIXEL IMAGE NON-UNIFORMITY COMPENSATION METHOD BASED ON CAPACITANCE TRIMMING AND IMAGE SENSOR HAVING PIXELS WITH VARIABLE CAPACITORS FOR NON-UNIFORMITY COMPENSATION

(71) Applicants: Kwai-Lee Pang, HsinChu (TW); Sai-Mun Lee, HsinChu (TW)

(72) Inventors: Kwai-Lee Pang, HsinChu (TW); Sai-Mun Lee, HsinChu (TW)

(73) Assignee: PixArt Imaging (Penang) SDN. BHD., Penang (MY)

( * ) Notice: Subject to any disclaimer, the term of this patent is extended or adjusted under 35 U.S.C. 154(b) by 0 days.

(21) Appl. No.: 14/599,513

(22) Filed: Jan. 18, 2015

(65) Prior Publication Data
US 2016/0212362 A1    Jul. 21, 2016

(51) Int. Cl.
| | | |
|---|---|---|
| *H04N 5/335* | (2011.01) | |
| *H04N 9/68* | (2006.01) | |
| *H04N 5/357* | (2011.01) | |
| *H04N 5/217* | (2011.01) | |
| *H04N 5/355* | (2011.01) | |

(52) U.S. Cl.
CPC .......... *H04N 5/3572* (2013.01); *H04N 5/2173* (2013.01); *H04N 5/3559* (2013.01)

(58) Field of Classification Search
CPC .............. G09G 2320/029; G09G 2320/0233; G09G 3/006; G09G 2300/0842; G09G 2320/0693; G09G 3/3233; G09G 2300/0809; G09G 2330/10; G09G 2360/147; G09G 3/36; G09G 5/10; G09G 2320/0295; G09G 2320/045
See application file for complete search history.

(56) References Cited

U.S. PATENT DOCUMENTS

| | | | | |
|---|---|---|---|---|
| 2004/0079977 A1* | 4/2004 | Ying | .................... | H04N 5/3559 257/292 |
| 2006/0013749 A1* | 1/2006 | Arencibia | .............. | B01F 7/1675 422/202 |
| 2006/0103749 A1* | 5/2006 | He | ........................ | H04N 5/2355 348/308 |
| 2011/0102305 A1* | 5/2011 | Tamura | ................ | G09G 3/3233 345/80 |

\* cited by examiner

*Primary Examiner* — Trung Diep
(74) *Attorney, Agent, or Firm* — Tung & Associates

(57) ABSTRACT

The present invention discloses a method for pixel image non-uniformity compensation. The method including the steps of: first, receiving an input image by an image sensor having a plurality of pixels, wherein each pixel includes a variable capacitor; next, calculating brightness information of at least a portion of the pixels; and further, trimming the capacitances of the variable capacitors in the portion of pixels respectively according to the brightness information.

17 Claims, 5 Drawing Sheets

PIXEL IMAGE NON-UNIFORMITY COMPENSATION METHOD BASED ON CAPACITANCE TRIMMING AND IMAGE SENSOR HAVING PIXELS WITH VARIABLE CAPACITORS FOR NON-UNIFORMITY COMPENSATION

BACKGROUND OF THE INVENTION

1. Field of Invention

The present invention relates to a method for compensating pixel image non-uniformity; particularly, it relates to such a method capable of compensating non-uniformity of a pixel image by capacitance trimming, and an image sensor having pixels with variable capacitors for non-uniformity compensation.

2. Description of Related Art

An image sensor captures an image and converts it to electronic signals. FIG. 1 shows a conventional image sensor 10 which includes an array of pixels 11 arranged by columns and rows. Such an image sensor for example can be used in an optical mouse, a digital camera, etc. In such a conventional image sensor, it often occurs that an image is not uniformly received by every pixel in the array. This could be due to the non-uniformity of the pixels themselves or due to the optical system mated with the sensor, or a combination of both. In the case of non-uniformity due to the optical system, this is usually due to the non-uniformity of the imaging lens system (also referred to as the "lens roll off" or "relative illumination" or "vignetting" of the lens) which is often provided in front of the image sensor, or the non-uniformity of the illumination system, or both, which causes a deviation of the brightness across the array. For example, the brightness of pixels near the edge of the image may be lower than the brightness of the pixels near the center of the image, although the original brightness of the object maybe the same or uniform. As a result, the pixels near the edge of the array suffer brightness degradation and is considerably darker than the pixels at the center.

This non-uniform brightness constitutes noise or a fixed pattern(s) to the system, and it remains relatively static even as the captured image changes. This noise or fixed pattern may undesirably affect the tracking performance of an optical mouse such as accuracy, maximum speed achieved or surface coverage, and also may undesirably affect the performance of a digital camera or other devices using the image sensor.

In view of the above, to overcome the drawback in prior art, the present invention proposes a method for compensating for the non-uniformity of the pixel image and an image sensor having pixels with variable capacitors for non-uniformity compensation. Such a method and image sensor is capable of compensating non-uniformity of a pixel image by capacitor trimming.

SUMMARY OF THE INVENTION

From one perspective, the present invention provides a method for pixel image non-uniformity compensation, the method comprising the steps of: (A) receiving an input image by an image sensor having a plurality of pixels, wherein each pixel includes a variable capacitor; (B) calculating brightness information of at least a portion of the pixels; and (C) trimming the capacitances of the variable capacitors in the portion of pixels respectively according to the brightness information.

In one embodiment, the brightness information of a pixel reflects brightness degradation of this pixel, and wherein a pixel with a relatively worse brightness degradation is compensated such that its variable capacitor has a relatively lower capacitance, whereas a pixel with a relatively lower brightness degradation is compensated such that its variable capacitor has a relatively higher capacitance.

In one embodiment, the input image is generated according to an original image which has a uniform brightness distribution.

In one embodiment, the input image is generated according to an original image which has a known brightness distribution, and the brightness information includes a difference between an actual brightness of a pixel and a brightness at a corresponding position in the original image.

In one embodiment, each of the variable capacitors includes a plurality of compensation capacitors electrically connected in parallel, and the conduction of each compensation capacitor is controlled by a corresponding switch.

In one embodiment, the step (C) includes: determining which of the compensation capacitors are conducted according to the brightness information.

In one embodiment, which of the compensation capacitors are conducted is set by a multi-bit digital signal.

In one embodiment, the plurality of pixels are arranged by columns and rows, and wherein a portion of bits of the multi-bit digital signal are sent through column wirings and the other bits of the n-bit digital signal are sent through row wirings.

In one embodiment, each of the variable capacitors further includes a fixed capacitor electrically connected in parallel with the plurality of compensation capacitors.

In one embodiment, the step (c) is performed pixel by pixel, or row by row, or column by column.

From one perspective, the present invention provides an image sensor comprising a plurality of pixels, wherein each of the pixels includes: an optical signal receiver unit for receiving light and generating first charges in response to the received light; a variable capacitor unit coupled to the optical signal receiver unit for storing second charges, wherein the amount of second charges stored in the variable capacitor unit is related to the amount of first charges generated in response to the received light; and an output unit coupled to the variable capacitor unit, for generating an output signal related to the amount of the second charges stored in the variable capacitor unit.

In one embodiment, the optical signal receiver unit includes: a first switch LS1 and a BJT transistor electrically connected in series to form a first series circuit between a power supply and a reference voltage level; a photo diode coupled to a base of the BJT transistor; and a second switch electrically connected in series to form a second series circuit between the power supply and the variable capacitor unit; wherein the first series circuit and the second series circuit are electrically connected through a third switch in between.

In one embodiment, the output unit includes a source follower, a fourth switch for read out and a current sink to bias the source follower. The output is subsequently pass to transfer amplifier/ADC.

DESCRIPTION OF THE PREFERRED EMBODIMENTS

The above and other technical details, features and effects of the present invention will be will be better understood with regard to the detailed description of the embodiments below, with reference to the drawings. The drawings as referred to throughout the description of the present invention are for illustration only, to show the interrelations between the components, but not drawn according to actual scale.

Figure 2:
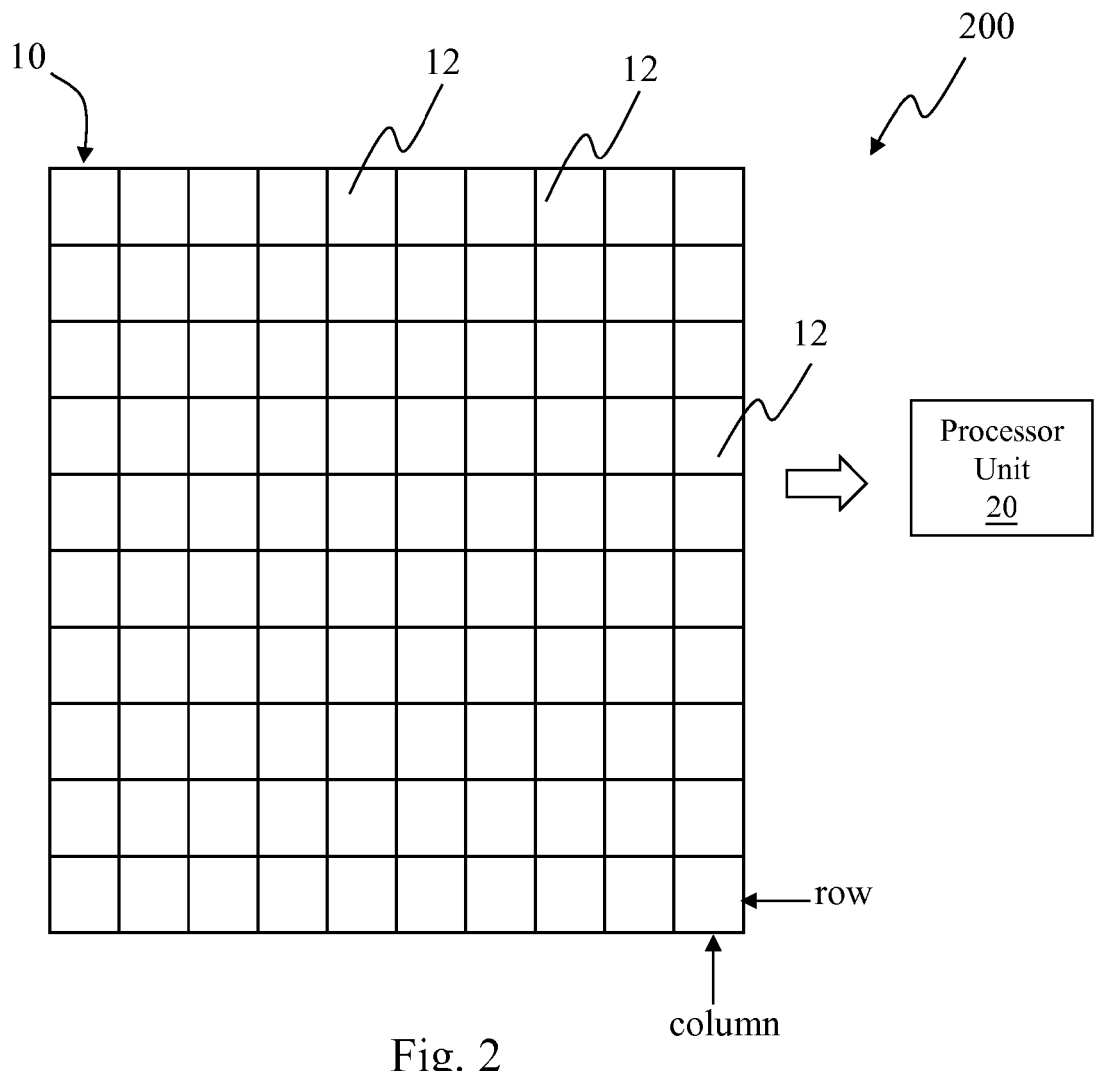
FIG. 2 shows an embodiment of a system capable of performing image pixel non-uniformity compensation according to the present invention.

Please refer to FIG. 2, which shows an illustrative embodiment of a system 200 capable of performing image pixel non-uniformity compensation according to the present invention. As shown in FIG. 2, the system 200 comprises an image sensor 10 and a processor unit 20. The image sensor 10 includes a plurality of pixels 12, preferably arranged in columns and rows but can be arranged by any other form. The image sensor 10 captures an image and converts it to electronic signals. The processor unit 20 processes these electronic signals.

Figure 3:
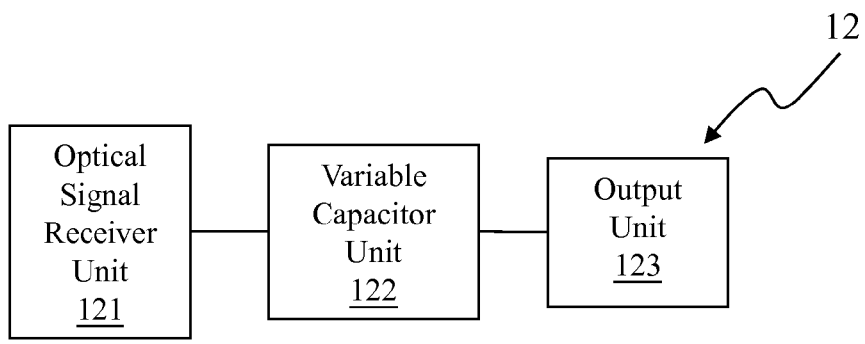
FIG. 3 shows a block diagram of a pixel according to an embodiment of the present invention.

Referring to FIG. 3, the pixel 12 according to the present invention includes an optical signal receiver unit 121, a variable capacitor unit 122, and an output unit 123. The optical signal receiver unit 121 receives light and generates charges in response to the received light. The variable capacitor unit 122 stores charges, and the amount of charges stored in the variable capacitor unit 122 is related to the amount of charges generated in response to the received light. The output unit 123 generates an output signal related to the amount of charges stored in the variable capacitor unit 122, which is an electronic signal representative of an optical signal received by the pixel. The pixel 12 according to the present invention is advantageous over the prior art pixel 11 in that it includes the variable capacitor unit 122 which can compensate the pixel array non-uniformity.

There are various forms of pixels, and the present invention will take a BJT pixel as an illustrative example to explain how the variable capacitor unit 122 is helpful for non-uniformity compensation. It should be noted that the present invention is applicable to other forms of pixels, not limited to a BJT pixel.

Figure 4:
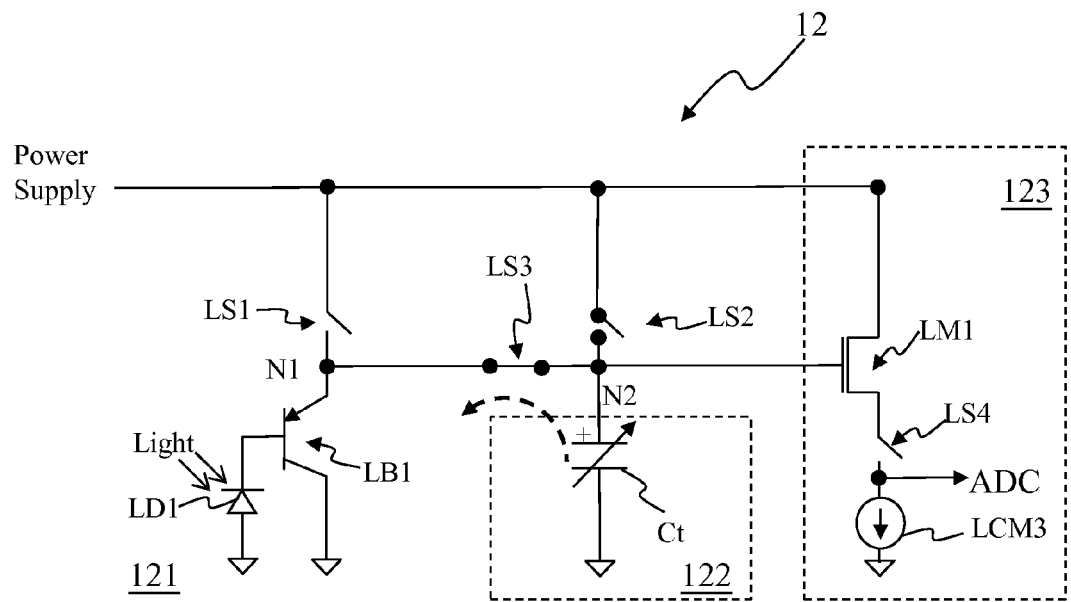
FIG. 4 shows a more detailed embodiment of a pixel according to the present invention.

Referring to FIG. 4, in one embodiment, the pixel 12 includes a pnp BJT (LB1), a np photo diode junction LD1, a switch LS1, a switch LS2, a variable capacitor Ct which has a variable capacitance, a transistor LM1 forming a source follower, a switch LS4 and a current sink LCM3. The switch LS1 and the pnp BJT LB1 are electrically connected in series to form a first series circuit between a power supply and a reference voltage level such as ground. The photo diode LD1 is coupled to the PNP transistor LB1; the photo diode LD1 generates charges in response to the received light, and the charges become a current when there is a conduction path. The switch LS2 is electrically connected in series between the power supply and the variable capacitor Ct, forming a second series circuit. The first series circuit and the second series circuit are electrically connected through the switch LS3 in between; the switch LS3 connects a common node N1 with a common node N2. The variable capacitor Ct is connected in series between the common node N2 and ground. In this embodiment, the output unit 123 includes a transistor LM1 forming a source follower, a switch LS4 and a current sink LCM3 electrically connected in series between the power supply and the reference voltage level, wherein the current sink LCM3 biases the source follower.

During operation, in a reset phase, the variable capacitor Ct and photodiode are reset by turning ON the switch LS2 and LS1 and turning OFF the switches LS3 and LS4. The voltage across the variable capacitor Ct is reset to a predetermined level. Next, in a shutter phase, the photo diode LD1 is exposed to light; the switch LS3 is turned ON and the switches LS1, LS2 and LS4 are turned OFF. The variable capacitor Ct discharges, so the voltage remaining in the variable capacitor Ct is related to the current generated by the photo diode LD1. Next, in a sampling phase, the switch LS4 is turned ON and the switches LS1, LS2 and LS3 are turned OFF. The transistor LM1 forms a source follower and the source voltage (Vs) of the transistor LM1 follows its gate voltage (Vg) by a difference of its threshold voltage (Vth), i.e., Vs=Vg−Vth. Thus, the output signal from the output unit 123 is the voltage remaining in the variable capacitor Ct minus the threshold voltage of the transistor LM1, which represents the optical signal received by the photo diode LD1. The output signal is an analog signal, which can be converted to a digital signal by an analog-to-digital converter (ADC).

Figure 1:
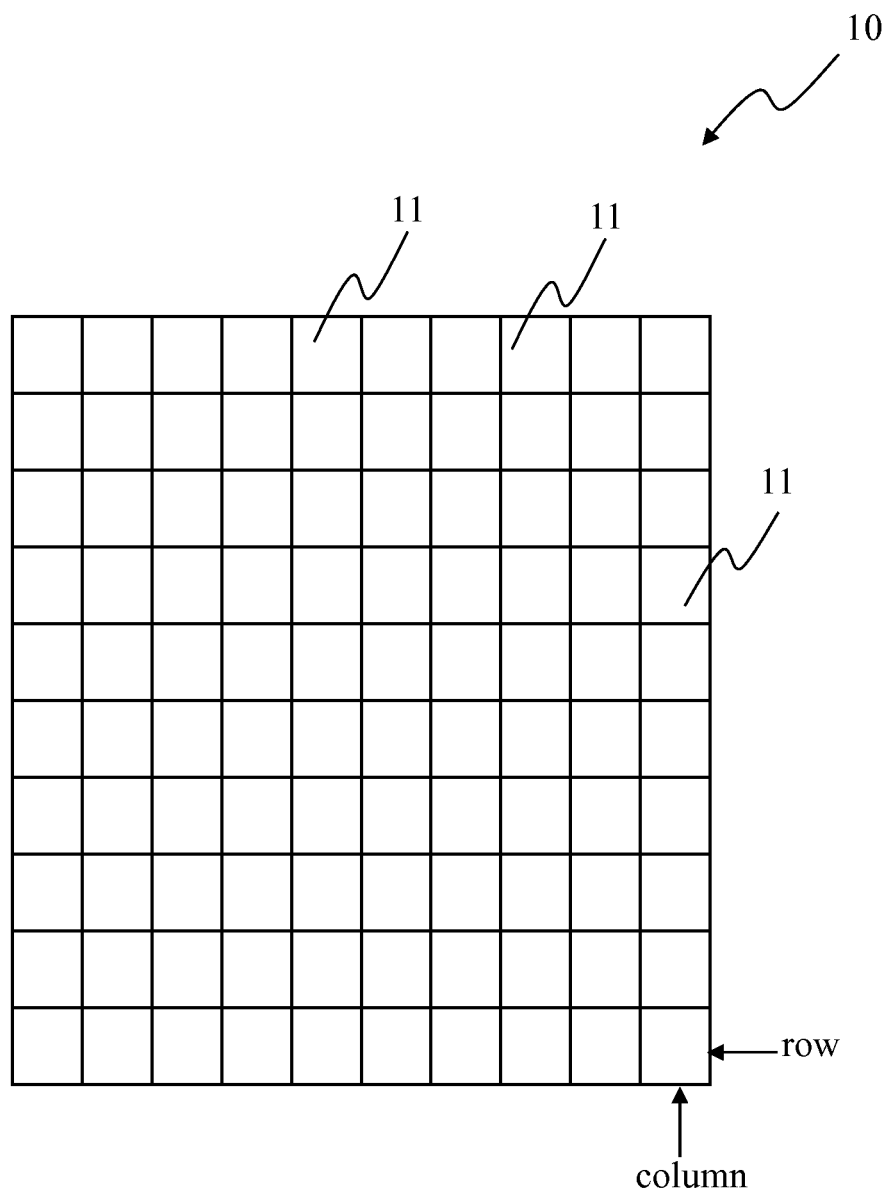
FIG. 1 shows a pixel array of a conventional image sensor.

An important feature of the present invention is that the variable capacitor Ct has a variable capacitance. Referring to FIG. 2, for example, the brightness of pixels near the edge of the image may be lower than the brightness of the pixels near the center of the image due to non-uniformity of an image lens provided in front of the image sensor, or due to non-uniformity of the illumination. According to the present invention, such non-uniformity can be compensated by adjusting the capacitance of the variable capacitor Ct. For example, if a pixel (such as one near the edge of the image) tends to have a lower brightness, the capacitance of such a pixel can be adjusted lower. On the other hand, if a pixel (such as one near the center of the image) tends to have a higher brightness, the capacitance of such a pixel can be adjusted higher. The amount of adjustment can be correlated to the brightness deviation between the actual brightness and the desired brightness. In this way, the non-uniformity can be compensated. In contrast, in the prior art of FIG. 1, the pixel 11 does not include a capacitor whose capacitance is variable, and the non-uniformity is not compensated.

Figure 5:
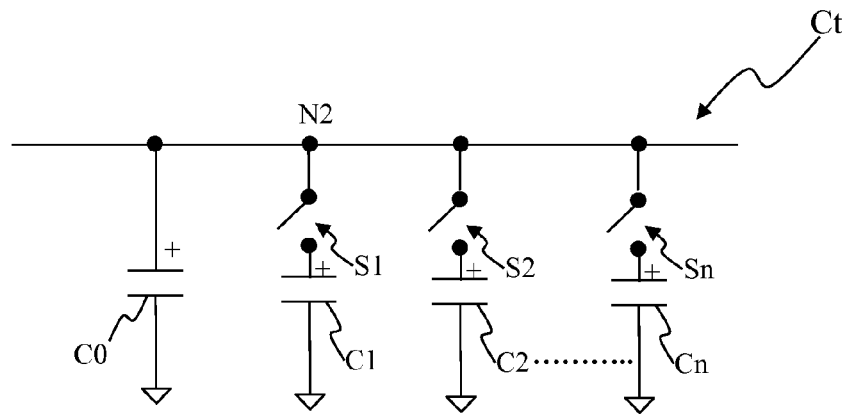
FIG. 5 shows an embodiment of a variable capacitor that can be used in the pixel of the present invention.

FIG. 5 shows one illustrative example of the variable capacitor Ct. In this embodiment, the variable capacitor Ct includes a fixed capacitor C0, plural compensation capacitors C1-Cn, and plural switches S1-Sn, wherein each compensation capacitor is electrically connected with a corresponding one of the switches S1-Sn to form a series circuit, and the series circuits of compensation capacitors and switches are electrically connected in parallel with the fixed capacitor C0. Thus, by providing a digital signal to control the switches S1-Sn, the variable capacitor Ct is a digitally variable capacitor. In one embodiment, the capacitance of the fixed capacitor may be set larger than any one of the compensation capacitors C1-Cn, such that the compensation capacitors C1-Cn provides a minor trimming function to fine-tune the capacitance of the variable capacitor Ct. However, please note that what is shown in FIG. 5 is only one non-limiting example and the variable capacitor Ct can be embodied in various other forms. For example, in one embodiment, there can be a switch provided between the capacitor C0 and the common node N2; in another embodiment, the capacitor C0 can be omitted.

Figure 6:
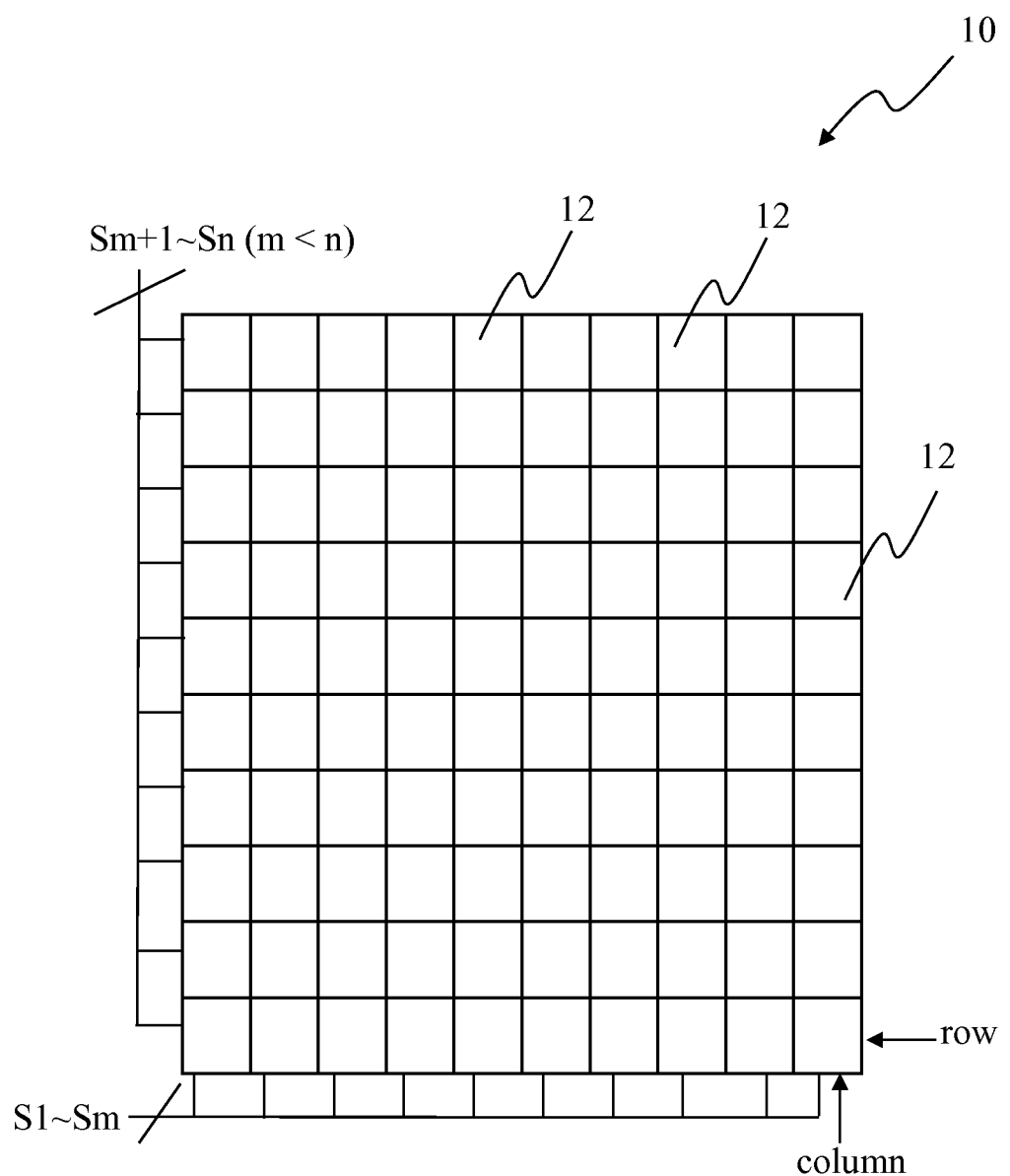
FIG. 6 shows a circuit and a method to trim the capacitances of the variable capacitors Ct of the pixels in an array.

FIG. 6 shows a circuit and a method to trim the capacitances of the variable capacitors Ct of the pixels in an array. In this embodiment, the pixels are arranged in an array by column and rows, and each of the variable capacitors Ct includes plural compensation capacitors C1-Cn, and plural switches S1-Sn, i.e., each variable capacitor Ct has a circuit structure the same or similar to the one shown in FIG. 5, with or without the fixed capacitor C0. The capacitances of the variable capacitors Ct of the pixels are trimmed by a digital signal which includes n bits for respectively controlling the switches S1, S2, . . . , Sm+1, . . . , Sn, wherein m<n, and both m and n are positive integers. The capacitances are trimmed per row (Sm+1–Sn), n>m and per column (S1-Sm) basis since they share common control signals. A digital signal including bits for respectively controlling the switches S1-Sn is sent in correspondence with a selected pixel, wherein the bits define the ON/OFF statuses of corresponding switches S1-Sn. Thus, the variable capacitors Ct of every pixel can be set to a desired capacitance. In this embodiment, as shown in the figure, some of the bits of the n-bit digital signal are sent through column wirings and the other bits of the n-bit digital signal are sent through row wirings. However, this is preferred but not necessary.

In one illustrative example as shown by the following table, there are one fixed capacitor C0 and five compensation capacitors C1-C5 in the variable capacitor Ct, wherein the capacitors C0-C5 have respective capacitances as listed in the first row of the table. The non-uniformity can be compensated by setting the variable capacitor Ct of each pixel to a desired capacitance. Certainly, this table is only one among many possible arrangements; the scope of the present invention is not limited by the number of the bits and the capacitances of the capacitors.

TABLE I

| 17 fF C5 | 32 fF C4 | 7 fF C3 | 4 fF C2 | 2 fF C1 | 64 fF C0 | Ctotal (fF) | Compensation Factor (%) |
|---|---|---|---|---|---|---|---|
| 1 | 0 | 0 | 1 | 0 | 1 | 85 | −12.37% |
| 1 | 0 | 1 | 1 | 1 | 1 | 94 | −3.09% |
| 1 | 0 | 1 | 0 | 1 | 1 | 90 | −7.22% |
| 1 | 0 | 1 | 1 | 1 | 1 | 97 | 0 |
| 1 | 1 | 0 | 1 | 0 | 1 | 117 | 20.62% |
| 1 | 1 | 0 | 1 | 1 | 1 | 119 | 22.68% |
| 1 | 1 | 1 | 0 | 1 | 1 | 122 | 25.77% |
| 1 | 1 | 1 | 1 | 0 | 1 | 124 | 27.84% |

In the above table, the term. "compensation factor" is defined by (capacitance difference/reference capacitance). The "reference capacitance" can be any pre-defined number, and the capacitance difference is the difference between the capacitance after compensation and the reference capacitance.

Figure 7:
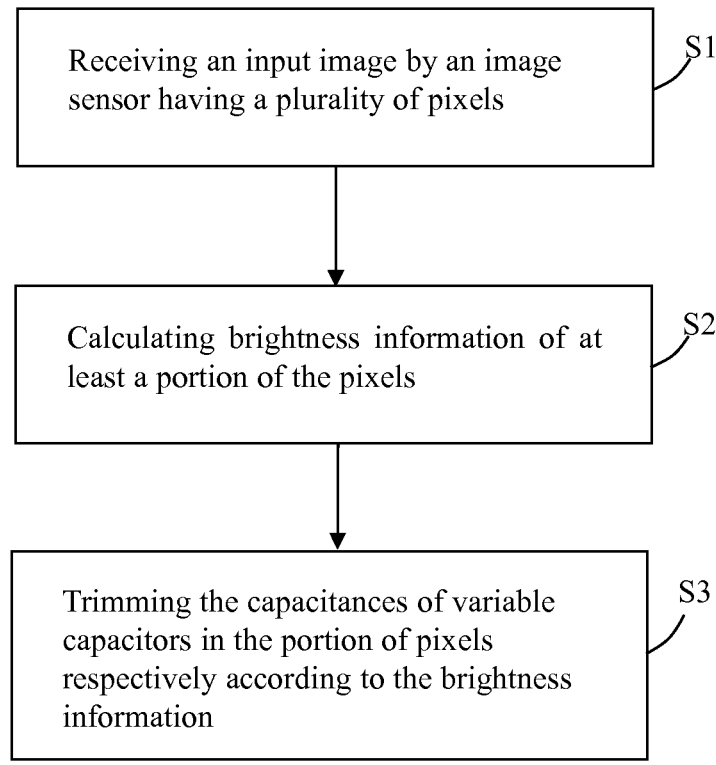
FIG. 7 is a flow chart showing a method according to an embodiment of the present invention for performing image pixel non-uniformity compensation by capacitance trimming.

FIG. 7 is a flow chart showing a method according to an embodiment of the present invention for performing image pixel non-uniformity compensation by capacitance trimming. Referring to FIG. 7, first, an input image is received by an image sensor having a plurality of pixels (step S1). In one embodiment, the pixels are arranged by columns and rows. Preferably, the input image is generated according to an original image which has a known brightness distribution; for example, the original image may have, but is not limited to, a uniform brightness distribution. The input image may be different from the original image because of, for example, non-uniformity of a lens in front of the image sensor.

Next, the brightness information of at least a portion of the pixels is calculated (step S2). The brightness information of a pixel reflects brightness degradation of this pixel. Although it is usually proper to calculate the brightness information of all the pixels, in some cases, it may not be required to calculate the brightness information of some of the pixels. For example, the brightness information of the pixels at the center area of an image sensor may not need to be calculated. The calculation of the brightness information of a pixel is for determining the compensation factor of this pixel. If the compensation factor of a pixel can be pre-determined, then it is not required to calculate the brightness information of this pixel. For example, the pixels at the center area of an image sensor usually do not suffer brightness degradation, so the compensation factors of these pixel can be pre-determined, such as set to a lowest compensation factor (for example, corresponding to a lowest capacitance setting of the variable capacitors Ct among all the pixels). Because the brightness distribution of the original image is known, the difference between the actual brightness of a pixel and the brightness at a corresponding position in the original image can be obtained. In one embodiment, the brightness information preferably includes information of such a difference. In another embodiment, the original image has a uniform brightness distribution, and in this case, the brightness information can simply be the actual brightness of the pixels.

Next, the capacitances of variable capacitors Ct in the portion of pixels are trimmed respectively according to the brightness information (step S3). A pixel with a relatively higher (worse) brightness degradation should be compensated such that its variable capacitor Ct has a relatively lower capacitance, whereas a pixel with a relatively lower (less worse) brightness degradation should be compensated such that its variable capacitor Ct has a relatively higher capacitance. If the capacitance of the variable Ct in a pixel is digitally selectable (such as but not limited to the embodiment as shown in FIG. 5), a table such as but not limited to the table I can be pre-established, which includes correlations between compensation factors and capacitances trimming settings (i.e., which of the compensation capacitors should be conducted). The brightness information of a pixel corresponds to a compensation factor, and the variable capacitor Ct can be set according to the compensation factor with reference to the correlations. Thus, a pixel can be compensated such that its variable capacitor Ct has a desired capacitance.

It should be noted that the trimming step can be performed pixel by pixel, row by row, or column by column.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, the pixel of the image sensor does not have to be a BJT pixel, but instead can be a pixel of any other form. A component which does not affect the primary function of a circuit or a device can be inserted between two components shown to be directly connected with each other. In view of the foregoing, the spirit of the present invention should cover all such and other modifications and variations, which should be interpreted to fall within the scope of the following claims and their equivalents.

What is claimed is:

1. A method for pixel image non-uniformity compensation, the method comprising the steps of:
   (A) receiving an input image by an image sensor having a plurality of pixels, wherein each pixel includes a variable capacitor;
   (B) calculating brightness information of at least a portion of the pixels; and
   (C) pixel-by-pixel, individually trimming the capacitances of the variable capacitors in the portion of pixels respectively according to the brightness information, such that the capacitance of at least one of the variable capacitors is different from the capacitance of at least another one of the variable capacitors to reduce non-uniformity among the plurality of pixels.

2. The method of claim 1, wherein the brightness information of a pixel reflects brightness degradation of this pixel, and wherein one of the pixels with a relatively worse brightness degradation is compensated such that its variable capacitor has a relatively lower capacitance, whereas another one of the pixels with a relatively less worse brightness degradation is compensated such that its variable capacitor has a relatively higher capacitance.

3. The method of claim 1, wherein the input image is generated according to an original image which has a uniform brightness distribution.

4. The method of claim 1, wherein the input image is generated according to an original image which has a known brightness distribution, and the brightness information includes a difference between an actual brightness of a pixel and a brightness at a corresponding position in the original image.

5. The method of claim 1, wherein each of the variable capacitors includes a plurality of compensation capacitors electrically connected in parallel, and the conduction of each compensation capacitor is controlled by a corresponding switch.

6. The method of claim 3, wherein the step (C) includes: determining which of the compensation capacitors are conducted according to the brightness information.

7. The method of claim 6, wherein which of the compensation capacitors are conducted is set by a multi-bit digital signal.

8. The method of claim 7, wherein the plurality of pixels are arranged by columns and rows, and wherein a portion of bits of the multi-bit digital signal are sent through column wirings and the other bits of the n-bit digital signal are sent through row wirings.

9. The method of claim 3, wherein each of the variable capacitors further includes a fixed capacitor electrically connected in parallel with the plurality of compensation capacitors.

10. The method of claim 1, wherein the step (c) is performed pixel by pixel, or row by row, or column by column.

11. An image sensor, comprising:
    a plurality of pixels, wherein each of the pixels includes:
       an optical signal receiver unit for receiving light and generating first charges in response to the received light;
       a variable capacitor unit coupled to the optical signal receiver unit for storing second charges, wherein the amount of second charges stored in the variable capacitor unit is related to the amount of first charges generated in response to the received light, the variable capacitor unit having a capacitance; and
       an output unit coupled to the variable capacitor unit, for generating an output signal related to the amount of the second charges stored in the variable capacitor unit,
    wherein the capacitance of the variable capacitor unit of at least one pixel is adjusted to be different from the capacitance of the variable capacitor unit of at least another pixel, to reduce non-uniformity among the plurality of pixels.

12. The image sensor of claim 11, wherein the variable capacitor unit includes a plurality of compensation capacitors electrically connected in parallel, and the conduction of each compensation capacitor is controlled by a corresponding switch.

13. The image sensor of claim 12, wherein which of the compensation capacitors are conducted is set by a multi-bit digital signal.

14. The image sensor of claim 13, wherein the plurality of pixels are arranged by columns and rows, and wherein a portion of bits of the multi-bit digital signal are sent through column wirings and the other bits of the n-bit digital signal are sent through row wirings.

15. The image sensor of claim 12, wherein the variable capacitor unit further includes a fixed capacitor electrically connected in parallel with the plurality of compensation capacitors.

16. The image sensor of claim 11, wherein the optical signal receiver unit includes:
    a first switch LS1 and a BJT transistor electrically connected in series to form a first series circuit between a power supply and a reference voltage level;
    a photo diode coupled to a base of the BJT transistor; and
    a second switch electrically connected in series to form a second series circuit between the power supply and the variable capacitor unit;
    wherein the first series circuit and the second series circuit are electrically connected through a third switch in between.

17. The image sensor of claim 11, wherein the output unit includes a source follower, a fourth switch and a current sink to bias the source follower.

* * * * *